(12) United States Patent
Ghabchi et al.

(10) Patent No.: US 10,682,725 B2
(45) Date of Patent: Jun. 16, 2020

(54) MICROSTRUCTURE REFINEMENT METHODS BY MECHANICAL WORK FOR ADDITIVE MANUFACTURED MATERIALS

(71) Applicant: The Boeing Company, Chicago, IL (US)

(72) Inventors: Arash Ghabchi, Chicago, IL (US); Christopher A. Meyer, Chicago, IL (US); James D. Cotton, Chicago, IL (US); Matthew J. Crill, Chicago, IL (US)

(73) Assignee: The Boeing Company, Chicago, IL (US)

( * ) Notice: Subject to any disclaimer, the term of this patent is extended or adjusted under 35 U.S.C. 154(b) by 269 days.

(21) Appl. No.: 15/827,024

(22) Filed: Nov. 30, 2017

(65) Prior Publication Data
US 2019/0160589 A1      May 30, 2019

(51) Int. Cl.
*B23K 26/00* (2014.01)
*B33Y 10/00* (2015.01)
(Continued)

(52) U.S. Cl.
CPC ........ *B23K 26/0093* (2013.01); *B22F 3/1055* (2013.01); *B23K 15/0086* (2013.01);
(Continued)

(58) Field of Classification Search
CPC .............. B23K 26/0093; B23K 26/144; B23K 26/342; B33Y 10/00; B33Y 30/00; B33Y 70/00
(Continued)

(56) References Cited

U.S. PATENT DOCUMENTS

2007/0122560 A1* 5/2007 Adams ................ C23C 4/02
427/523
2007/0158200 A1* 7/2007 Cohen ................ B81C 99/0095
205/80
(Continued)

FOREIGN PATENT DOCUMENTS

GB      24914712 B      6/2018
WO      2012152259 A1   11/2012

OTHER PUBLICATIONS

Donoghue, Jack et al., "Integration of Deformation Processing with Additive Manufacture of Ti-6Al-4V Components for Improved ß Grain Structure and Texture." TMS2015 Annual Meeting Supplemental Proceedings, TMS (The Minerals, Metals & Materials Scoiety), 2015, 8 pages.

(Continued)

*Primary Examiner* — Vishal Pancholi
(74) *Attorney, Agent, or Firm* — McDonnell Boehnen Hulbert & Berghoff LLP

(57) ABSTRACT

Example implementations relate to techniques for refining the microstructure of metallic materials used for additive manufacturing. An example can involve generating a first layer of an integral object using a material with grains structured in a first arrangement. After a threshold duration occurs since generating the first layer, the example can involve applying an external force to the first layer to cause deformations in the first arrangement of grains. The example can further involve generating a second layer coupled to the first layer of the integral object to form a portion of the integral object. Generating the second layer of the integral object causes the material of the first layer to recrystallize new grains to replace grains proximate the deformations. The grains that result from recrystallization are structured in (Continued)

new arrangement that improves the physical and mechanical properties of the layer and subsequent layers collective.

20 Claims, 4 Drawing Sheets

(51) Int. Cl.
| | |
|---|---|
| B33Y 70/00 | (2020.01) |
| B23K 26/144 | (2014.01) |
| B23K 26/342 | (2014.01) |
| B24C 1/10 | (2006.01) |
| C22F 1/00 | (2006.01) |
| B33Y 30/00 | (2015.01) |
| B23P 15/00 | (2006.01) |
| B24C 1/00 | (2006.01) |
| B23K 15/00 | (2006.01) |
| B22F 3/105 | (2006.01) |
| B33Y 80/00 | (2015.01) |

(52) U.S. Cl.
CPC .......... *B23K 26/144* (2015.10); *B23K 26/342* (2015.10); *B23P 15/00* (2013.01); *B24C 1/00* (2013.01); *B24C 1/10* (2013.01); *B33Y 10/00* (2014.12); *B33Y 30/00* (2014.12); *B33Y 70/00* (2014.12); *C22F 1/00* (2013.01); *B22F 2003/1056* (2013.01); *B22F 2999/00* (2013.01); *B33Y 80/00* (2014.12)

(58) Field of Classification Search
USPC ........................................................ 219/76.1
See application file for complete search history.

(56) References Cited

U.S. PATENT DOCUMENTS

| | | | | |
|---|---|---|---|---|
| 2013/0108726 | A1* | 5/2013 | Uckelmann | B29C 67/0007 425/174.4 |
| 2013/0316183 | A1* | 11/2013 | Kulkarni, Jr. | B23P 6/007 428/557 |
| 2014/0087210 | A1* | 3/2014 | Keane | B22F 7/02 428/810 |
| 2015/0266285 | A1* | 9/2015 | James | B33Y 40/00 419/28 |
| 2015/0335434 | A1* | 11/2015 | Patterson | A61F 2/30767 623/23.5 |
| 2016/0136759 | A1* | 5/2016 | Broda | B22F 3/1055 219/76.1 |
| 2017/0326681 | A1* | 11/2017 | Sidhu | C22F 1/183 |

OTHER PUBLICATIONS

Martina, Filomeno et al., "Microstructure of Interpass Rolled Wire + Arc Additive Manufacturing Ti-6Al-4V Components," Metallurical and Materials Transactions A, vol. 46A, Dec. 2015, 16 pages.

Donoghue, J. et al., "The Effectiveness of Combining Rolling Deformation with Wire-Arc Additive Manufacture on ß-grain Refinement and Texture Modification in Ti-6Al-4V," Materials Characterization 114 (2016, 12 pages.

Kou, Sindo, "Welding Metallurgy, Second Edition," Wiley-Interscience, A John Wiley & Sons, Inc., Publication, Copyright 2003, 466 pages.

European Search Report for European application No. 18198961.7 dated Mar. 2, 2020.

* cited by examiner

MICROSTRUCTURE REFINEMENT METHODS BY MECHANICAL WORK FOR ADDITIVE MANUFACTURED MATERIALS

FIELD

The present disclosure relates generally to additive manufacturing processes, and more particularly, to techniques for refining the microstructure of metallic materials used for additive manufacturing.

BACKGROUND

Unlike traditional manufacturing that relies on subtractive techniques (e.g., cutting, drilling) to remove material from bulk shapes to arrive at a final shape, additive manufacturing builds shapes through precisely adding and consolidating layers of material according to a three-dimensional (3D) digital model. Depending on the underlying material used, various consolidation techniques can be used to fuse layers to form the desired structure, such as powder bed fusion, direct energy deposition (welding, electron-beam and laser processing), photo-polymerization, material jetting, binder jetting, and extrusion.

Additive manufacturing is often used to create functional prototypes or components out of polymeric materials. Plastics, rubbers, and other polymeric materials are typically used since consolidation techniques for blending layers of these materials together are economical and readily available. Conversely, metallurgical challenges and reduced properties associated with consolidating layers of metallic materials (e.g., metals, alloys, compounds) often reduce or even prevent their use for additive manufacturing. As a result, additive manufacturing exhibits limited viability for metallic materials and is confined to highly specialized components for medical, aviation, or other unique purposes.

One of the main reasons that consolidation techniques are difficult for a metallic material is the underlying microstructure of the material. In particular, metals and alloys consist of a large number of irregularly shaped crystals, also referred to herein as grains. Although indiscernible to the naked eye, the sizes and arrangement of these grains dictate the material's properties, including its strength, ductility, fatigue durability, strain rate, and resistance to creep deformation, among other properties. As such, the sizes and arrangement of the grains typically depend on the thermal and deformation history of the metallic material.

When fabricating a metallic object by additive manufacturing, the material is usually heated and deposited in layers to form the desired structure. For instance, depositing a new layer of heated metallic material upon a substrate or prior layer enables some grains of the material to experience elongated growth as a result of epitaxial growth. The elongated grains typically grow together in one well-defined orientation (e.g., columnar orientations) with respect to the substrate or prior layer, which can diminish the growth rate of other grains positioned in the traverse direction. As a result, the microstructure of the deposited layer is dominated by a few elongated grains with similar crystal orientations causing the layer to have anisotropic properties (i.e., physical and mechanical properties that vary depending on direction of measurement). Since the anisotropic properties compound with the addition of more layers growing in similar ways, the additively manufactured structure can vary in tensile strength, ductility, and other properties, relative to conventional wrought or cast options that can undesirably impact its viability. These deficiencies can prevent metallic materials from being used to additively manufacture many types of structures, including structures with minimal design margins.

One technique currently used to reduce anisotropic properties in deposited layers involves applying a rolling wheel to impart surface deformation upon each layer prior to adding the subsequent layer. Although the rolling wheel technique can promote grain recrystallization within deposited layers, the size and space required to use the rolling wheel limits overall applicability to additively manufacturing processes depositing material with thicker features and simple geometrical shapes. Therefore, there is a need for a technology that can refine the microstructure of a deposited layer of metallic material during additive manufacturing that can accommodate structures with generic scale and types of designs.

SUMMARY

In one example, a method is described. The method includes generating a first layer of an integral object having one or more interconnected components. The first layer is generated using a material that comprises a first plurality of grains structured in a first arrangement, and the material is configurable to couple to a subsequent layer generated on the first layer to form a portion of the integral object. The method further includes, after a threshold duration occurs since generating the first layer of the integral object, applying external force to at least one portion of the first layer. The application of external force causes one or more deformations in the first arrangement of the first plurality of grains of the material. The method also includes generating a second layer coupled to the first layer of the integral object. In particular, generating the second layer causes the material of the first layer to recrystallize a second plurality of grains to replace one or more sets of grains of the first plurality of grains proximate the one or more deformations. The second plurality of grains is structured in a second arrangement that differs from the first arrangement.

In another example, an apparatus is described. The apparatus comprises an integral object having one or more interconnected components. The integral object includes a first layer generated using a material that comprises a first plurality of grains structured in a first arrangement. The material is configurable to couple to a subsequent layer generated on the first layer to form a portion of the integral object. After a threshold duration occurred since generation of the first layer, an application of external force is applied to at least one portion of the first layer to cause one or more deformations in the first arrangement of the first plurality of grains of the material. The integral object further includes a second layer coupled to the first layer of the integral object. Generation of the second layer causes the material of the first layer to recrystallize a second plurality of grains to replace one or more sets of grains of the first plurality of grains proximate the one or more deformations. The second plurality of grains is structured in a second arrangement that differs from the first arrangement.

In another example, a method is described. The method includes generating a first layer of an integral object having one or more interconnected components. The first layer is generated using a metal that comprises elongated grains having columnar orientations that cause the first layer of the metal to have anisotropy properties. The metal is configurable to couple to a subsequent layer generated on the first layer to form a portion of the integral object. After a threshold duration occurs since generating the first layer of the integral object, applying external force to at least one portion of the first layer. The application of external force causes one or more deformations in the columnar orientations of the elongated grains of the metal. The method further includes generating a second layer coupled to the first layer of the integral object. Generating the second layer causes the metal of the first layer to recrystallize equiaxed grains to replace one or more of the elongated grains of the metal of the first layer proximate the one or more deformations. The equiaxed grains cause the first layer of the metal to have isotropic properties.

The features, functions, and advantages that have been discussed can be achieved independently in various examples or can be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Figure 1:
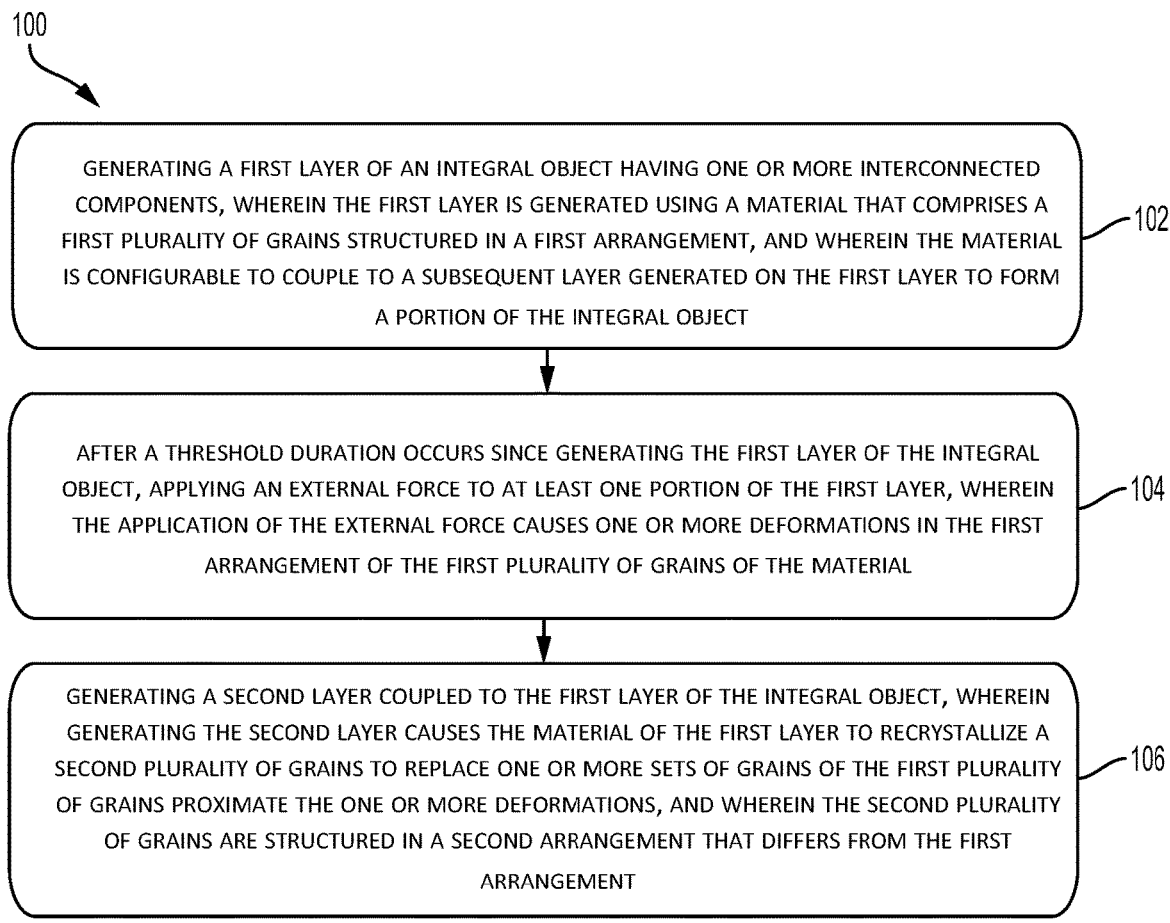
FIG. 1 shows a flowchart of an example method for refining the microstructure of a material used for additive manufacturing, according to an example implementation.

Disclosed examples will now be described more fully hereinafter with reference to the accompanying drawings, in which some, but not all of the disclosed examples are shown. Indeed, several different examples can be described and should not be construed as limited to the examples set forth herein. Rather, these examples are described so that this disclosure will be thorough and complete and will fully convey the scope of the disclosure to those skilled in the art.

Examples relate to techniques for refining the microstructure of a metallic material used for additive manufacturing. Particularly, some examples involve applying cold work during the additive manufacturing process to restructure the microstructure of deposited layers of metallic materials. Cold work can cause deformations in a deposited layer through the application of external force. Subsequent recrystallization can restructure the microstructure of the cold-worked layer. As such, restructuring the microstructure of each deposited layer (or a subset of the layers) can improve the strength as well as other properties of the additively manufactured structure.

As indicated above, additive manufacturing involves depositing and consolidating materials according to a 3D design model to create a desired structure. For instance, techniques for generating desired structures can involve wire feed or powder feed additive manufacturing processes. After depositing a layer of metallic material, the underlying grains of the material typically grow unevenly. In particular, epitaxial and preferred growth of the material on a substrate or a prior layer can cause some grains to become elongated. These elongated grains often grow together in a particular orientation (e.g., columns) preventing grains arranged in other orientations from growing as much. This uneven growth of grains in the microstructure of the material causes the layer to have anisotropic properties that can undesirably impact the layer's strength and effectiveness. When left unaltered, an additively manufactured structure made up of anisotropic layers can be susceptible to diminished properties for the desired use.

In order to enhance the properties of layers and the additively manufactured structure overall, cold work is used to alter the microstructure of the material making up each layer. Cold work is the plastic deformation of a metallic material below its recrystallization temperature. In particular, cold work changes the microstructure of a deposited layer of metallic material through the application of external force. The external force causes plastic deformation, also referred to as cold work, and manifests in the form of nanometer-scale linear defects termed 'dislocations', within the arrangement of the grains of the deposited layer influencing the material's properties. As such, cold work increases dislocation density and alters grain size distribution in order to allow recrystallization by the subsequently deposited layer. There are several techniques for applying cold work, including the example techniques included in table 1.

TABLE 1

| Squeezing | Bending | Drawing | Shearing |
|---|---|---|---|
| Rolling | Angle | Bar and Tube Drawing | Shearing |
| Swaging | Roll | Wire Drawing | Slitting |
| Cold Forging | Roll Forming | Spinning | Blanking |
| Sizing | Drawing | Embossing | Piercing |
| Extrusion | Seaming | Stretch Forming | Lancing |
| Riveting | Flanging | Shell Drawing | Perforating |
| Staking | Straightening | Ironing | Notching |
| Coining | | High-energy Rate Forming | Nibbling |
| Peening | | | Shaving |
| Burnishing | | | Trimming |
| Die Hobbing | | | Cutoff |
| Thread Rolling | | | Dinking |

As indicated above, the accumulation of cold work requires metallic material to be below its static recrystallization temperature. Therefore, when applying cold work during an additive manufacturing process, cooling can be necessary to allow a freshly deposited layer of metallic material to decrease enough in temperature before applying cold work. Allowing the deposited layer to decrease in temperature prior to applying external force to the layer can help avoid potential disturbance or unwanted deformations to the layer.

Although decreasing the temperature of a deposited layer requires time or a prescribed cooling technique, cold work has many advantages over hot work. In particular, hot work might not impart enough deformations for subsequent recrystallization. Further, cold work can not cause grain growth, does not require a heat source, allows for precise dimension control compared to hot work, produces better surface finishes, and improves strength properties of finished product forms, while also minimizing directional properties of the metallic material.

In some examples, cold work is applied by peening a layer of metallic deposited material after the material drops below its recrystallization temperature. Shot peening involves projecting a set of physical objects (e.g., metal balls) at a layer to cause the deformations at the grain level of the metallic material. Similar to shot peening, ultrasonic peening is another type of peening that can apply external force to a deposited layer. Unlike shot peening, ultrasonic peening involves projecting sonic impulse waves to create deformation in a deposited layer.

These cold work techniques as well as others can also reduce or potentially eliminate the need for other stress relieving processes during additive manufacturing, by mechanically causing the redistribution of local thermal stress gradients in deposited layers. In turn, overall cost and flow time can be reduced by eliminating process steps. In addition, unlike the rolling wheel technique, peening as well as several other types of cold work techniques listed in table 1 do not place shape or size limits on the geometrical designs of a structure for additive manufacturing.

Upon depositing a subsequent layer on a cold-worked layer, the heat from the new layer can cause the cold-worked layer to recrystallize. Recrystallization is the nucleation and growth of new grains. Through recrystallization, the cold-worked layer replaces strained grains with strain-free grains. These new strain-free grains nucleate at nanometer-scale dimensions, and typically grow to remain similar in size (e.g., average diameter) and morphologies, unlike the large, elongated grains that they are replacing. For instance, the new grains can have smaller and more spherical sizes relative to the elongated grains. In addition, the recrystallized grains tend to grow in more random orientations causing the layer to have more isotropic properties. Isotropic properties indicates that the properties of the layer are consistent regardless of the direction of measurement.

In order to improve the properties of an additively manufactured structure, the above technique involving cold work and recrystallization is applied to all layers (or a subset of layers) during additive manufacturing. The outcome produces a refined microstructure that is stronger, more ductile and more durable with more balanced mechanical properties regardless the direction of measurement. As such, cold work and recrystallization make additively manufactured structures fabricated from metallic materials less susceptible to fracture and failure, and provide a more reliable, lightweight and cost-effective product.

Referring now to the Figures, FIG. 1 shows a flowchart of an example method for refining the microstructure of a material used for additive manufacturing. Method 100 shown in FIG. 1 presents an example of a method that could be used to refine the microstructure of one or more materials used during additive manufacturing.

Method 100 can include one or more operations, functions, or actions as illustrated by one or more of blocks 102, 104, and 106. Although the blocks are illustrated in a sequential order, these blocks can also be performed in parallel, and/or in a different order than those described herein. Also, the various blocks can be combined into fewer blocks, divided into additional blocks, and/or removed based upon the desired implementation.

At block 102, the method 100 involves generating a first layer of an integral object having one or more interconnected components. An integral object is a structure with one or multiple components formed together as a single-piece. For instance, an integral object can be a component, part, item, or another type of object. The layer and consolidation process of additive manufacturing enables production of wide array of integral objects with various shapes and designs. Unlike traditional manufacturing, additively manufactured objects do not require fasteners (e.g., screws, nails) to have multiple elements connected together.

As indicated above, additive manufacturing involves depositing layers of one or multiple metallic materials together to form a desired integral object according to a 3D data model. Example metallic materials that can be used include, but are not limited to pure and alloys of the following base metals: iron, nickel, cobalt, copper, aluminum, titanium, zirconium, scandium, zinc, magnesium, gold and silver. In some instances, compounds of materials can also be used. For instance, a compound can include multiple metals physically or chemically combined. The materials selected for an additively manufactured object typically depend on the cost of materials and the dimensions and desired use of the object.

During the deposition of a layer, a metallic material is heated and shaped. For instance, a laser can melt a metallic material enabling formation of the desired shape for the component. To form portions of the structure, the material or materials selected for the first layer (and additional layers) are configurable to couple to subsequent layers (i.e., blend together to form a single portion). The layers are fused/consolidated together create a seamless end structure that does not require fasteners to connect elements.

As discussed above, when a layer of metallic material is deposited on a substrate or a prior layer, a few grains might dominate the growth and become elongated. These elongated grains result from epitaxial growth and limit the growth of grains positioned in other orientations. Since the elongated grains tend to grow in particular grain orientations (e.g., columnar orientations) and crystal directions, the unbalanced grain structure causes the layer to have anisotropic properties.

At block 104, the method 100 involves applying an external force to at least one portion of the first layer. After depositing the first layer of metallic material, the layer can have anisotropic properties as a result of epitaxial growth of elongated grains. In order to reduce the anisotropic properties, cold work is applied to the first layer.

As discussed above, cold work involves applying external force upon portions of the deposited layer to cause one or more deformations in the arrangement of grains. In some examples, cold work is applied at a rate and an intensity that causes a percentage of the layer to incur deformations. For instance, cold work can be applied such that twenty percent (20%) of a deposited layer experiences deformations. Other examples can involve applying cold work at different rates or intensities to cause other amounts of deposited layer to endure deformations (e.g., 50% of a layer can incur deformations as a result of cold work).

In other examples, the percentage of deformations of the layer can depend on the type and crystal structure of the material of the layer. The accumulation of cold work, however, requires the temperature of the deposited layer to be below the material's recrystallization temperature—otherwise, dynamic recrystallization can occur and some of the microstructure refinement can be lost and made difficult to control.

In some examples, cold work is applied to the deposited layer after a threshold duration occurs since the generation of the layer. This threshold duration can depend on an amount of time required for the material of the deposited layer to decrease below its recrystallization temperature. For example, the threshold duration required for titanium to decrease below its recrystallization temperature can differ from the threshold duration required for aluminum to decrease below its recrystallization temperature. Particularly, titanium alloys are hearted up to the upper end of the alpha-beta temperature range for titanium, for example. In some instances, recrystallization temperatures are highly dependent on various factors, such as the type and chemistry of alloy or metal used, amount of cold work applied (i.e., more cold work can reduce the required temperature), and time the layer is able to be at the recrystallization temperature.

In further examples, applying the external force is applied to a top surface of the first layer of material to cause deformations at multiple positions in the arrangement of the grains of the first layer. For instance, the external force can be applied after a threshold duration that is based on an amount of time required for the material of the first layer to recrystallize grains such that refined grains replace at least a threshold portion of the grains that originally made up the first layer.

Accordingly, once the layer cools off enough, cold work is applied. A temperature sensor can indicate when the layer cooled off enough. In other examples, the process can involve allowing the layer to cool off for a threshold duration that depends on the type of material. Particularly, the threshold duration can depend on prior tests and measurements to determine the duration required for allowing the layer to decrease enough in temperature to receive cold work. In some instances, a cooling gas or another technique can be used to decrease the deposited material below its recrystallization temperature.

As shown in Table 1, various cold work techniques can apply an external force to a deposited layer. For instance, shot peening is a process that causes deformations by projecting a set of physical objects (e.g., metal beads) at a deposited layer. The projections can be directed at the entire top surface of the deposited, multiple surfaces, or select portions of the layer. Similarly, ultrasonic peening is another type of peening that involves projecting sonic impulses rather than physical objects at portions of the deposited layer to cause deformations.

Another cold work technique involves using a rotary flapper to apply external force to a deposited layer. A rotary flapper is configured with multiple flaps containing metal or other hard materials that are solid enough to engage and cause deformations to the grain structure when the rotary flapper is moved relative to and within a threshold distance from the layer. The flappers need to have enough strength to cause deformations to a deposited layer without damage to the flappers. The threshold distance depends on the size of the flaps, the desired quantity of deformations, and other potential factors. Other cold work techniques can also be used.

At block 106, the method 100 involves generating a second layer coupled to the first layer of the integral object. The integral object can correspond to a structure with one or more interconnected components formed as a single-piece. In order to produce the integral object, additional layers are deposited until the integral object is completely formed. The additional layers can be formed from the same material or different material(s) from prior layers.

When a second layer is deposited on the first layer, the heat from the second layer can cause the first layer to undergo recrystallization. The amount of heat provided to the first layer by the second layer can vary within examples. For instance, the amount of heat provided can depend on the energy input rate and speed of deposition of the second layer such that enough heat and time enables the first layer to recrystallize.

As discussed above, recrystallization replaces deformed grains with a new set of grains that initially nucleate and grow until the deformed grains have been entirely consumed. As a result of recrystallization, the grain structure of the cold-worked layer differs from the initial arrangement of the layer before cold work and recrystallization. In particular, recrystallization can produce smaller, rounded grains positioned in random crystal orientations (equiaxed grain structures, where the grain structure has approximately equal dimensions) that replace the elongated grains. This grain arrangement made up of smaller, randomly oriented grains causes the layer to have isotropic properties improving its overall property suite. In some examples, generating the second layer coupled to the first layer of the integral object can involve depositing the second layer such that grains in the second arrangement of the first layer after recrystallization have respective grain sizes that are less than grain sizes of the elongated grains of the first layer before recrystallization.

Figure 2:
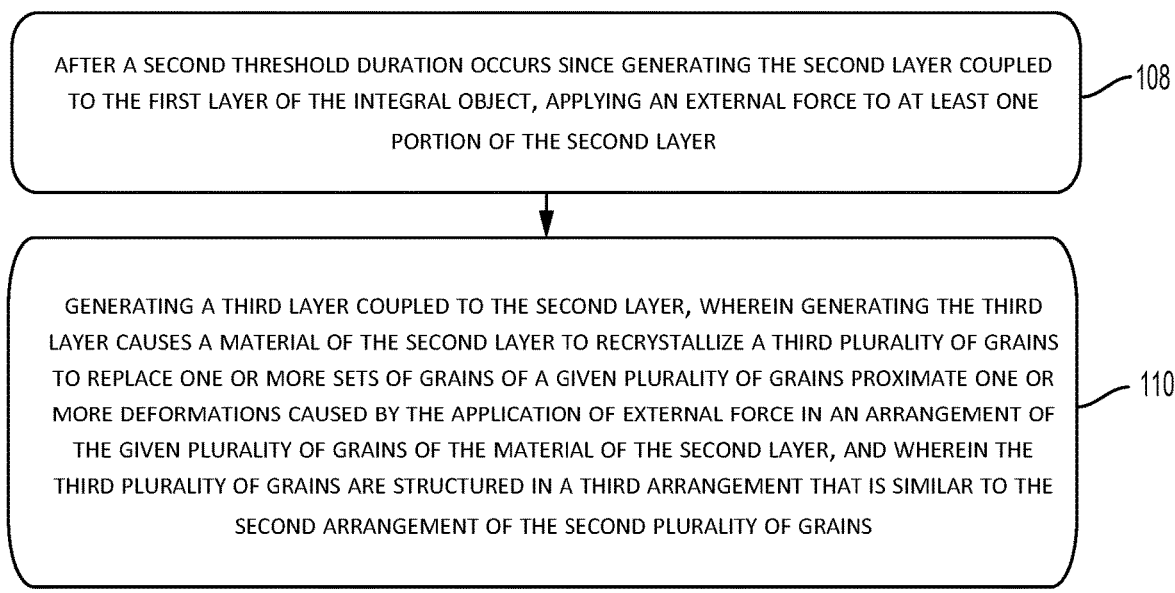
FIG. 2 shows a flowchart of an example method for use with the method shown in FIG. 1, according to an example implementation.

FIG. 2 shows a flowchart of an example method for use with the method 100, according to an example implementation. At block 108, functions include applying an external force to at least one portion of the second layer. The amount of the external force applied can mirror the amount of the external force applied to the first layer. In other instances, the amount of force can differ. For example, the second layer can consist of a different material that requires more external force.

As indicated above, additive manufacturing generates the integral object by consolidating multiple layers of material. As such, in order to form and complete the integral object, additional layers are deposited on top of prior layers until the integral object is complete. The quantity, size, and forms of each additional layer depends on the dimensions and design of the integral object. Particularly, some layers can have more or less material in different shapes depending on the design of the integral object.

To ensure the additional layers maintain desired properties (e.g., strength, ductility), cold work is similarly applied to these layers. The cold work technique used can remain the same or differ between layers. As shown in table 1, there are numerous options for applying cold work. In some examples, the same cold work technique (e.g., peening) is applied for each layer. In other examples, different cold work techniques are used across the generation of layers. For example, shot peening can be used to cold work a first layer and a rotary flapper can be used to cold work a second layer.

In some examples, multiple cold work techniques are used to apply cold work to each layer. As an example, in one example, both shot peening and ultrasonic peening are used to apply external force to each deposited layer during the additive manufacturing of an object. The type, duration, and quantities of cold work techniques utilized to plastic deform layers during additive manufacturing can depend on the size and shape of the layers, type of material used, and other potential factors. In a further example, multiple cold work techniques are used on different portions of a deposited layer.

As indicated above, cold work requires metallic material to be below its recrystallization temperature. Thus, after generating the second layer, cold work might not be applied until a second threshold duration occurs to enable the second layer to cool sufficiently below than the recrystallization temperature for the material. In some instances, the threshold duration can depend on several factors, such as the heat input associated with depositing subsequent layers, thermal conductivity of the material of the second layer, and presence of external cooling. The second threshold duration depends on the material of the second layer as well as the initial temperature of the material after the second layer is deposited. In some examples, cooling spray or other techniques are used to reduce the temperature of the newly deposited second layer.

At block 110, functions include generating a third layer of the integral object coupled to the second layer of the integral object. The third layer is consolidated with the first and second layers to further form the integral object. Depositing the third layer provides heat that stimulates the material in the cold-worked second layer to recrystallize to replace strained and deformed grains with a new set of smaller, rounded grains that are arranged at random crystal orientations. The amount of heat provided by the deposited third layer can increase the cold-worked layer to a temperature suitable for performing recrystallization. As such, the amount of heat provided by the third layer can differ depending on the materials making up the second layer.

As discussed above, recrystallization restructures the arrangement and grain sizes of a cold-worked layer resulting in isotropic properties and improved strength. Deposition of layers is iterative in order to create the final desired structure. As such, the properties of each layer can differ depending on various factors, such as the amount of cold work each layer received, the shape and thickness of each layer, the type of material used, the duration of deposition and recrystallization, among other factors.

Figure 3:
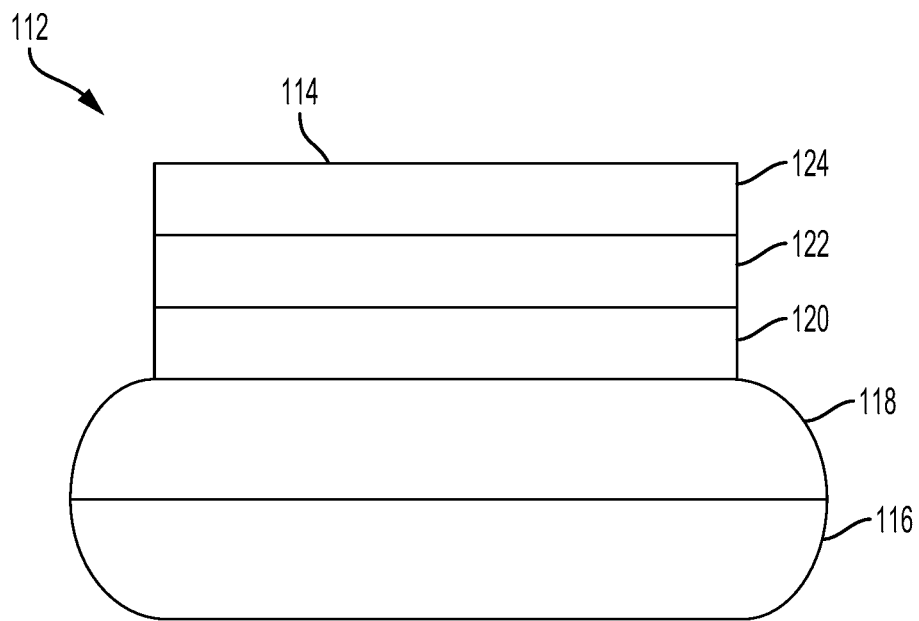
FIG. 3 is an illustration of an apparatus generated using microstructure refinement techniques during additive manufacturing, according to an example implementation.

FIG. 3 is an illustration of an apparatus 112 generated using microstructure refinement techniques during additive manufacturing. The apparatus 112 involves an integral object 114 made up of one or multiple interconnected components generated and blended together during additive manufacturing. As shown, the integral object 114 is made up of a first layer 116, a second layer 118, a third layer 120, a fourth layer 122, and a fifth layer 124. Other additively manufactured integral objects can have more or fewer layers shaped in other configurations.

The apparatus 112 represents an additively manufactured vessel configured to hold and display flowers. The method 100 shown in FIGS. 1 and 2 or another additive manufacturing technique can create apparatus 112. Each deposited layer (i.e., the layers 116-124) is shown with noticeable connections for illustration purposes to depict the layout of the layers 116-124. The layers 116-124 can consist of various metallic materials, such as aluminum, titanium, alloys, etc. In addition, the height and width of the layers 116-124 are exaggerated in FIG. 3 for illustration purposes, but can be smaller in implementations.

When additively manufacturing the apparatus 112, each layer of the integral object 114 is deposited, cooled, and cold worked before depositing the next layer. For instance, generation of the apparatus 112 initially involves depositing and forming the first layer 116 on a substrate. Epitaxial growth relative to the substrate can cause unbalanced grain growth that impacts the properties of the first layer 116. As a result, after depositing the first layer 116, the first layer 116 is allowed to cool prior to an application of cold work. The first layer 116 can cool over time or using another technique (e.g., a fan) that allows the material to drop in temperature below its recrystallization temperature. Upon cooling, one or multiple techniques of cold work are applied to cause deformations in the grain structure of the first layer 116. The cold work is applied across an entirety of the first layer 116 or particular portions (e.g., top surface).

After the first layer 116 is cold worked, the second layer 118 is deposited on the first layer 116 to form a portion of the integral object 114. In some instances, the second layer 118 is deposited immediately after the first layer 116 receives cold work. In other cases, the first layer 116 is allowed to cool off and release some energy that is left from the application of cold work before the second layer 118 is deposited. As such, the deposition of the second layer 118 promotes recrystallization in the first layer 116, which replaces the deformed grains with a new set of grains. The new set of grains has smaller, rounded grains that are arranged at random crystal orientations improving the strength and balance of the first layer 116.

The above process is repeated to strengthen layers as the additional layers (e.g., the third layer 120, the fourth layer 122, and the fifth layer 124) are deposited. This repetition across multiple layers improves the overall strength of the apparatus 112 and can ensure that adding layers does not weaken the integral object 114.

Figure 4:
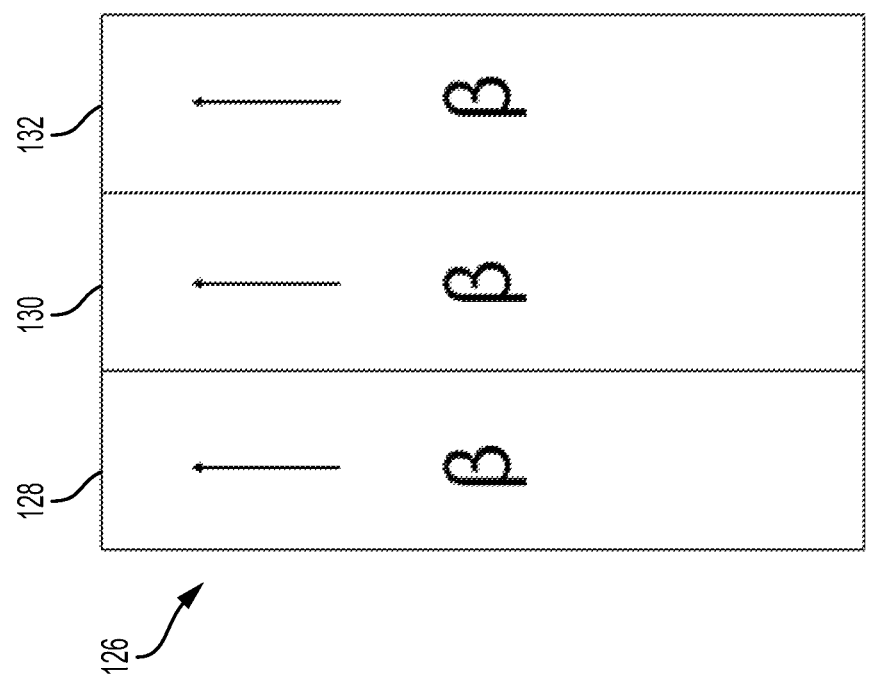
FIG. 4 is an illustration of elongated grains with aligned crystal direction that make up part of the microstructure of a deposited layer, according to an example implementation.

FIG. 4 is an illustration of elongated grains with aligned crystal direction that make up part of the microstructure of a deposited layer. The portion 126 of the deposited layer shown in FIG. 4 includes an elongated grain 128, an elongated grain 130, and an elongated grain 132 arranged in columnar orientations. After a layer is deposited during additive manufacturing, epitaxial growth causes some grains to dominate growth and become elongated. As shown in FIG. 4, these elongated grains 128-132 often grow together in a particular orientation that causes the deposited layer to have anisotropic properties undesirably impacting the layer's strength. The growth of these elongated grains 128-132 also prevents other grains at different orientations in the layer from experiencing similar growth. For these reasons, cold work is used to deform and allow restructuring of the grains to reduce the anisotropic properties.

Figure 5:
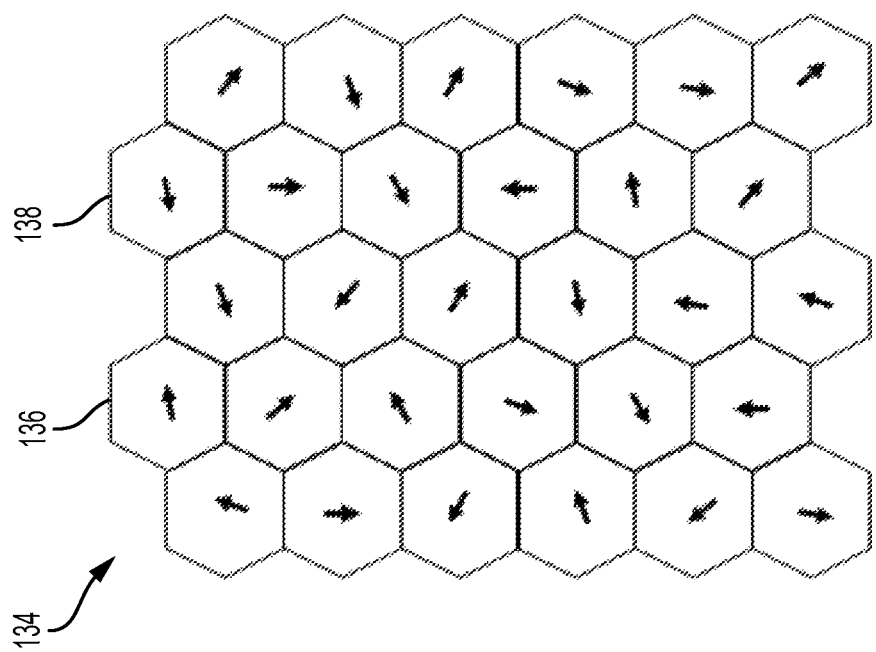
FIG. 5 is an illustration of refined grains with random crystal orientations that make up part of the microstructure of the deposited layer shown in FIG. 4, according to an example implementation.

FIG. 5 is an illustration of refined grains with more random crystal orientations that make up part of the microstructure of the deposited layer shown in FIG. 4. In particular, the portion 134 represents the deposited layer described in FIG. 4 after the layer undergoes cold work and recrystallization.

As discussed above, cold work is applied to cause deformations in the grain structure of a deposited layer and then a new layer is deposited on the cold-worked layer. The heat from the new layer causes the material in the cold-worked layer to recrystallize into new grains to replace grains deformed by the cold work. As shown in portion 134 in FIG. 5, recrystallization produces smaller grains (e.g., grain 136, grain 138) that have random crystal orientations as represented by the arrows. These rounded, smaller grains replace the elongated grains 128-132 shown in FIG. 4 increasing the strength of the layer. As a result, the strengthened layer allows for a stronger additively manufactured structure.

Figure 6:
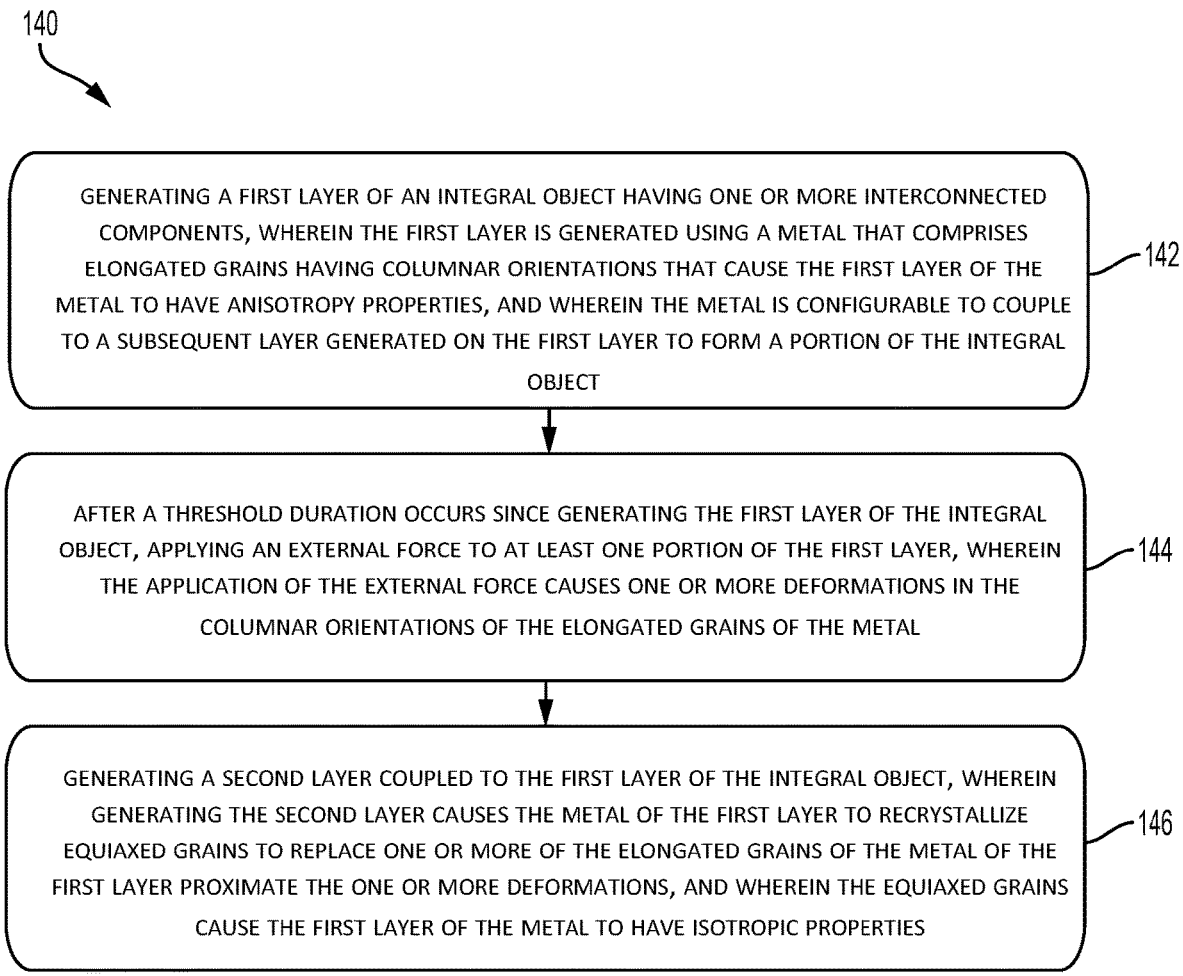
FIG. 6 shows a flowchart of an example method for refining the microstructure of a metal used for additive manufacturing, according to an example implementation.

FIG. 6 shows a flowchart of an example method for refining the microstructure of a metal used for additive manufacturing. Method 140 shown in FIG. 6 presents another example of a method that could be used to refine the microstructure of a metal or another material used during AM.

Method 140 can include one or more operations, functions, or actions as illustrated by one or more of blocks 142, 144, and 146. Although the blocks are illustrated in a sequential order, these blocks can also be performed in parallel, and/or in a different order than those described herein. Also, the various blocks can be combined into fewer blocks, divided into additional blocks, and/or removed based upon the desired implementation.

At block 142, the method 140 involves generating a first layer of an integral object having one or more interconnected components. Particularly, the first layer is deposited using a metal (e.g., titanium, aluminum) that grows such that a set of elongated grains dominate the overall growth. For instance, the elongated grains can grow in columnar orientations that prevent other grains in opposing orientations from growing as much. As a result, the deposited layer of metal can have anisotropic properties.

At block 144, the method 140 involves applying external force to at least one portion of the first layer. After waiting a threshold duration to allow the first layer to cool off, one or multiple cold work techniques are applied to cause deformations in the columnar orientations of the elongated grains of the metal. As discussed above, the threshold duration can be reduced or even replaced by a cooling spray or other technique.

At block 146, the method 140 involves generating a second layer of the integral object coupled to the first layer of the integral object. In particular, generating the second layer of the integral object causes the metal of the first layer to recrystallize into equiaxed grains to replace one or more of the elongated grains of the metal of the first layer proximate the one or more deformations. These equiaxed grains have smaller, rounded sizes and are arranged in random crystal orientations. The new grain structure causes the deposited layer of metal to have isotropic properties that improve the strength and durability of the layer.

By the term "substantially" or "about" used herein, it is meant that the recited characteristic, parameter, or value need not be achieved exactly, but that deviations or variations, including for example, measurement error, measurement accuracy limitations and other factors known to a person having ordinary skill in the art, can occur in amounts that do not preclude and/or occlude the effect the characteristic was intended to provide.

The description of the different advantageous arrangements has been presented for the purposes of illustration and description, and is not intended to be exhaustive or limited to the examples in the disclosed form. Many modifications and variations will be apparent to those of ordinary skill in the art. Further, different advantageous examples can describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method comprising:
    generating a first layer of an integral object having one or more interconnected components, wherein the first layer is generated using a material that comprises a first plurality of grains structured in a first arrangement, and wherein the material is configurable to couple to a subsequent layer generated on the first layer to form a portion of the integral object;
    after a threshold duration occurs since generating the first layer of the integral object, applying an external force using a first technique to a first portion of the first layer and using a second technique to a second portion of the first layer, wherein an application of the external force causes one or more deformations in the first arrangement of the first plurality of grains of the material, wherein the first technique and the second technique are different, and wherein a type of the first technique and a type of the second technique are based on a size and a shape of the first layer; and
    generating a second layer coupled to the first layer of the integral object, wherein generating the second layer causes the material of the first layer to recrystallize a second plurality of grains to replace one or more sets of grains of the first plurality of grains proximate the one or more deformations, and wherein the second plurality of grains are structured in a second arrangement that differs from the first arrangement.

2. The method of claim 1, wherein the material is a metal, and wherein generating the first layer of the integral object comprises using wire feed additive manufacturing.

3. The method of claim 1, wherein the material is an alloy, and wherein generating the first layer of the integral object comprises using powder feed additive manufacturing.

4. The method of claim 1, wherein generating the first layer of the integral object with the first plurality of grains structured in the first arrangement comprises depositing the first layer such that a plurality of elongated grains originate from epitaxial growth.

5. The method of claim 4, wherein generating the first layer of the integral object with the first plurality of grains structured in the first arrangement comprises depositing the first layer such that the elongated grains in the first plurality of grains have columnar orientations that cause the first layer of the material to have anisotropic properties.

6. The method of claim 4, wherein generating the second layer coupled to the first layer of the integral object comprises depositing the second layer such that the second plurality of grains structured in the second arrangement have respective grain sizes that are less than grain sizes of the plurality of elongated grains in the first plurality of grains.

7. The method of claim 1, wherein after the threshold duration occurs since generating the first layer of the integral object, applying the external force using the first technique to the first portion of the first layer and using the second technique to the second portion of the first layer comprises:
    applying the external force to at least one portion of the first layer after a given threshold duration that depends on an amount of time required for the material of the first layer to decrease below a recrystallization temperature for the material of the first layer.

8. The method of claim 1, wherein generating the second layer coupled to the first layer of the integral object comprises:
    depositing the second layer such that the second plurality of grains structured in the second arrangement have equiaxed grain structures and random crystal orientations that cause the first layer of the material to have isotropic properties.

9. The method of claim 1, wherein applying the external force using the first technique to the first portion of the first layer and using the second technique to the second portion of the first layer comprises:

applying the external force using a shot peening process, wherein the shot peening process involves projecting a set of physical objects at one or more portions of the first layer of the material to cause the one or more deformations in the first arrangement of the first plurality of grains of the material.

10. The method of claim 1, wherein applying the external force using the first technique to the first portion of the first layer and using the second technique to the second portion of the first layer comprises:
applying the external force using a rotary flapper, wherein the rotary flapper includes one or more flaps configured to cause the one or more deformations in the first arrangement of the first plurality of grains of the material when the rotary flapper is positioned and moved within a threshold distance from the first layer.

11. The method of claim 1, wherein applying the external using the first technique to the first portion of the first layer and using the second technique to the second portion of the first layer comprises:
applying the external force using ultrasonic peening, wherein the ultrasonic peening involves projecting sonic impulses at one or more portions of the first layer of the material to cause the one or more deformations in the first arrangement of the first plurality of grains of the material.

12. The method of claim 1, wherein applying the external force comprises providing heat to the first layer of the material that stimulates recrystallization at the one or more deformations.

13. The method of claim 1, wherein generating the second layer coupled to the first layer of the integral object comprises generating the second layer using material that corresponds to the material of the first layer of the integral object.

14. The method of claim 1, wherein generating the second layer coupled to the first layer of the integral object comprises generating the second layer using a second material that differs from the material of the first layer of the integral object.

15. The method of claim 1, wherein applying the external force using the first technique to the first portion of the first layer and using the second technique to the second portion of the first layer comprises:
applying the external force to a top surface of the first layer of the material to cause a plurality of deformations at a plurality of positions in the first arrangement of the first plurality of grains of the material; and
wherein the threshold duration is based on an amount of time required for the material of the first layer to recrystallize the second plurality of grains such that the second plurality of grains replace at least a threshold portion of the first plurality of grains.

16. The method of claim 1, further comprising:
after a second threshold duration occurs since generating the second layer coupled to the first layer of the integral object, applying an external force to at least one portion of the second layer; and
generating a third layer coupled to the second layer, wherein generating the third layer causes a material of the second layer to recrystallize a third plurality of grains to replace one or more sets of grains of a given plurality of grains proximate one or more deformations caused by the application of the external force in an arrangement of the given plurality of grains of the material of the second layer, and wherein the third plurality of grains are structured in a third arrangement that is similar to the second arrangement of the second plurality of grains.

17. An apparatus comprising:
an integral object having one or more interconnected components, wherein the integral object comprises:
a first layer generated using a material that comprises a first plurality of grains structured in a first arrangement, wherein the material is configurable to couple to a subsequent layer generated on the first layer to form a portion of the integral object, wherein after a threshold duration occurred since generation of the first layer, an application of an external force is applied using a first technique to a first portion of the first layer and using a second technique to a second portion of the first layer to cause one or more deformations in the first arrangement of the first plurality of grains of the material, wherein the first technique and the second technique are different, and wherein a type of the first technique and a type of the second technique are based on a size and a shape of the first layer; and
a second layer coupled to the first layer of the integral object, wherein generation of the second layer causes the material of the first layer to recrystallize a second plurality of grains to replace one or more sets of grains of the first plurality of grains proximate the one or more deformations, and wherein the second plurality of grains are structured in a second arrangement that differs from the first arrangement.

18. The apparatus of claim 17, wherein the application of the external force using the first technique to the first portion of the first layer and using the second technique to the second portion of the first layer to cause one or more deformations in the first arrangement of the first plurality of grains of the material includes using a rotary flapper, wherein the rotary flapper includes one or more flaps that caused the one or more deformations in the first arrangement of the first plurality of grains of the material when the rotary flapper is positioned and moved within a threshold distance from the first layer.

19. The apparatus of claim 17, wherein the application of the external force using the first technique to the first portion of the first layer and using the second technique to the second portion of the first layer to cause one or more deformations in the first arrangement of the first plurality of grains of the material includes using ultrasonic peening, wherein the ultrasonic peening includes projecting sonic impulses at one or more portions of the first layer of the material to cause the one or more deformations in the first arrangement of the first plurality of grains of the material.

20. A method comprising:
generating a first layer of an integral object having one or more interconnected components, wherein the first layer is generated using a metal that comprises elongated grains having columnar orientations that cause the first layer of the metal to have anisotropy properties, and wherein the metal is configurable to couple to a subsequent layer generated on the first layer to form a portion of the integral object;
after a threshold duration occurs since generating the first layer of the integral object, applying an external force using a first technique to a first portion of the first later and using a second technique to a second portion of the first layer, wherein an application of the external force causes one or more deformations in the columnar orientations of the elongated grains of the metal, wherein the first technique and the second technique are different, and wherein a type of the first technique and a type of the second technique are based on a size and a shape of the first layer; and generating a second layer coupled to the first layer of the integral object, wherein generating the second layer causes the metal of the first layer to recrystallize equiaxed grains to replace one or more of the elongated grains of the metal of the first layer proximate the one or more deformations, and wherein the recrystallized equiaxed grains cause the first layer of the metal to have isotropic properties.

* * * * *